2,986,505
PRODUCTION OF ACETYLENE
James L. Lauer, Philadelphia, and Patrick J. Friel, Broomall, Pa., assignors to Sun Oil Company, Philadelphia, Pa., a corporation of New Jersey
Filed May 12, 1958, Ser. No. 734,709
2 Claims. (Cl. 204—156)

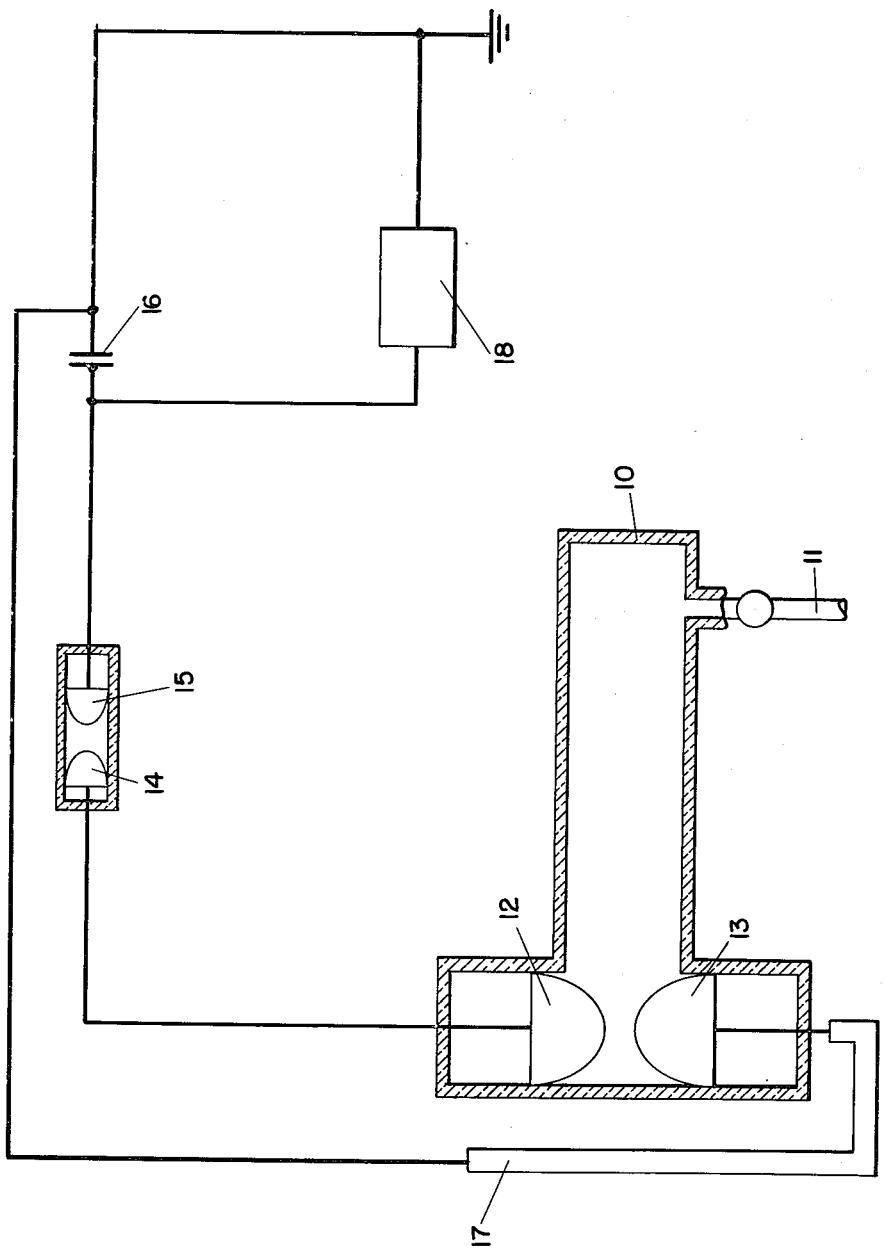

This invention relates to the production of acetylene, and more particularly to a process in which methane is subjected to a substantially simultaneous electric discharge and a magnetically driven shock wave whereby to increase the yield of acetylene over that obtained when an electrical discharge alone is used.

Conversion of methane to acetylene by passing a gas stream containing methane through an electric arc is well known to the art. We have now discovered that the yield of acetylene, per unit of electrical power, may be substantially increased by subjecting the methane to a magnetically driven shock wave at the same time as it is subjected to the electrical discharge. This may be accomplished by subjecting the methane to a series of discontinuous spark discharges across a pair of electrodes, of which the ground electrode is connected to a lead parallel to the spark gap, and closely spaced thereto. The magnetic field of this lead is perpendicular to the discharge current, so that when a discharge is struck between the electrodes there is a force exerted across the discharge which increases the velocity of the shock wave generated by the heating effect of the spark.

In order that those skilled in the art may more fully understand the nature of our invention, it will be described in detail in connection with the accompanying drawing which is a sketch of an apparatus useful in practicing the invention.

Referring now to the drawing, reaction tube 10 is provided with valved line 11 leading to a suitable means for regulating the pressure in tube 10, such as a vacuum pump (not shown). A pair of stainless steel electrodes 12 and 13, respectively, having a spark gap therebetween are located in tube 10 adjacent one end thereof. A second pair of electrodes 14 and 15, respectively, and a capacitor 16 is connected in series with electrodes 12 and 13, the breakdown voltage of the gap between electrodes 14 and 15 being higher than that of the gap between electrodes 12 and 13. Ground lead 17, which is connected to electrode 13, is formed of heavy brass strap, and passes upwardly in close juxtaposition to the gap between electrodes 12 and 13. Capacitor 16 is energized by a high voltage power supply 18.

In the operation of the apparatus reactor 10 is filled with methane and the pressure within reactor 10 is adjusted to the desired value. Capacitor 16 is then charged by power supply 18 to a voltage sufficient to break down the gap between electrodes 14 and 15. Since the breakdown voltage between electrodes 12 and 13 is less than that between electrodes 14 and 15 the spark will jump the gap between electrodes 12 and 13. When this happens the gas between the electrodes is suddenly heated to a high temperature and a rapid expansion results. This rapid expansion generates a shock wave which propagates along the length of reactor 10. Simultaneously, current flowing through ground lead 17 sets up a magnetic field which exerts a force in the same direction as the travel of the shock wave. The combination of the electric discharge and the magnetically driven shock wave serves to convert a very high percentage of the methane in reactor 10 to acetylene.

As an example of the results which may be obtained by proceeding according to the present invention, the data in the following table are presented. In obtaining this data an apparatus similar to that described in connection with the drawing was used. The power supply 18 was a direct current 30,000 volt, 200 microamperes source, and the capacitor 16 was a 25,000 volt, 1.6 microfarad, 0.025 microhenry capacitator. With this equipment it was possible to jump the spark gap between electrodes 14 and 15 about once every thirty seconds. The break down voltage of the gap between electrodes 14 and 15 was about 21,000 volts. In the runs utilizing magnetic drive ground lead 17 was placed as indicated in Fig. 1, whereas in the runs without magnetic drive ground lead 17 was moved about 12 cm. away from the spark gap and a grounded iron screen was placed between the ground lead and the spark gap to provide additional magnetic screening.

*Table 1*

| | With Magnetic Drive | | Without Magnetic Drive | |
|---|---|---|---|---|
| Original Pressure in Reactor (mm. Hg) | 12.5 | 11.3 | 11.6 | 12.6 |
| Final Pressure in Reactor (mm. Hg) | 22.2 | 20.4 | 19.5 | 21.0 |
| Number of Shocks | 23 | 21 | 22 | 22 |
| Total Energy Input in Joules | 8,100 | 7,400 | 7,700 | 7,700 |
| Analysis of Product (Mol. percent): | | | | |
| Hydrogen | 74.1 | 75.9 | 68.6 | 67.7 |
| Methane | 5.4 | 4.2 | 13.2 | 14.8 |
| Acetylene | 17.1 | 17.4 | 15.3 | 14.9 |
| Other $C_1$ | 0.6 | 0.5 | 0.6 | 0.6 |
| $C_3$ | 0.3 | 0.4 | 0.4 | 0.3 |
| Diacetylene | 0.6 | 0.3 | 0.4 | 0.3 |
| Yields: Percent C admitted as $CH_4$ converted to— | | | | |
| Acetylene | 60.9 | 62.8 | 51.4 | 49.6 |
| $C_2+C_3$ | 3.5 | 3.3 | 4 | 4 |
| Diacetylene | 4.5 | 2.2 | 2.7 | 2 |

As may be observed from the foregoing, the application of magnetic drive increased the percentage of acetylene in the products from about 15% to about 17%, and increased the yield of acetylene, based on carbon admitted to the reactor from about 50%, in the case where no magnetic drive was used, to about 61%, when using magnetic drive. The amount of unconverted methane was strikingly decreased by the magnetic drive, viz., from about 13.5 to 4.5%.

The invention claimed is:

1. A process for the production of acetylene which comprises subjecting a gaseous hydrocarbon charge stock consisting essentially of methane confined in a closed reactor to a series of discontinuous direct current electric spark discharges and substantially sumultaneously to a series of magnetically-driven shock waves of sufficient intensity to enhance the production of acetylene.

2. A process for the production of acetylene which comprises subjecting hydrocarbon charge stock consisting essentially of methane to a series of discontinuous direct current electric spark discharges to produce shock waves and substantially simultaneously to an intermittent magnetic field acting perpendicular to the spark discharge to increase the velocity of the shock wave along the length of a closed reaction tube thereby enhancing the production of acetylene.

References Cited in the file of this patent

UNITED STATES PATENTS

| | | |
|---|---|---|
| 1,902,384 | Steinbuch et al. | Mar. 21, 1933 |
| 2,745,861 | Bodine | May 15, 1956 |
| 2,832,666 | Hertzberg et al. | Apr. 28, 1958 |

FOREIGN PATENTS

| | | |
|---|---|---|
| 5,688 of 1904 | Great Britain | Jan. 12, 1905 |
| 16,636 of 1911 | Great Britain | Apr. 25, 1912 |
| 444,526 | Great Britain | Mar. 25, 1936 |

OTHER REFERENCES

Landshoff: Magnetohydrodynamics (April 1957).